Patented Feb. 13, 1951

2,541,727

UNITED STATES PATENT OFFICE 2,541,727

DIAZOTYPES CONTAINING ALDEHYDE REACTION PRODUCTS OF DIHYDROXY ARYL COMPOUNDS

William H. von Glahn, Loudonville, and Lester N. Stanley, Delmar, N. Y., assignors to General Analine & Film Corporation, New York, N. Y., a corporation of Delaware No Drawing. Application December 17, 1947, Serial No. 792,338

7 Claims. (Cl. 95—6)

This invention relates to the production of diazotype light sensitive layers and, more particularly, to the improvement of the photographic density of the image obtained by using such light sensitive layers.

In the duplication or reproduction of originals which are transparent or semi-transparent, such as tracings or engineering drawings or typewritten documents, by the diazotype positive reproduction method, it is highly desirable that the image reproduced on the diazotype be one of high contrast. Accordingly, the selection of dye components for the production of the light sensitive layer is limited to those components which will produce deep shades upon development of the image. Such components as combine to give images of high contrast having high visual density generally do not possess sufficient photographic density or opacity to ultraviolet light to render them suitable for use as intermediate copies in the further production of diazotype or other photosensitive copies by the transition process. In many cases, particularly where the original to be reproduced is frail or for some other reason incapable of being exposed repeatedly to ultraviolet light, it is necessary and desirable to make a print therefrom which is thereafter used as the original or master copy for the production of further copies.

In all diazotype reproduction processes, whether the copy is to be used as a master copy for further reproduction work or whether the diazotype copy is to be used as the only copy, the finished print should reproduce the image in high color density having brightness of shade which is fast to water, light and offset. It is an object of this invention, therefore, to provide diazotype light sensitive layers and color components which will reproduce the original in a bright shade having high color density which is fast to water, light and offset and which also is highly absorptive of ultraviolet light so that it may be used as a transition print in the further copying of the original design onto photo-sensitive copy media.

In the production of diazotype light sensitive layers which are designed for reproduction of the original in colors having ultraviolet light absorption characteristics making them suitable for transition printing, azo components such as resorcinol have heretofore been employed. While resorcinol and the like components reproduce the image in azo dye colors having the requisite opacity to ultraviolet light, the precoupling stability of the diazotype layer is not sufficient to assure prolonged storage before use. It has been found that transparent paper or film carrying the usual diazo compounds and resorcinol in the light sensitive layer for this purpose gradually develop a discoloration prior to use produced by premature coupling. Upon subsequent use of such diazotypes the background areas will contain different discoloration, thus impairing the ability of those areas to transmit actinic light. Therefore, it is not possible to obtain a colorless background in subsequent reproductions obtained from the use of the transition print as an original.

It has now been found that a new class of azo dye coupling components not heretofore used in diazotype reproduction media may be employed in a light sensitive layer with suitable diazo compounds on a transparentized paper or film or other transparent carrier which, upon exposure and development, will give a sepia image having high actinic opacity or photographic density, good color density and excellent wash fastness, fastness to light and offset. This combination will also provide a two-component diazotype light sensitive layer having high stability to precoupling. This class of azo dye coupling components comprises the condensation products of aliphatic aldehydes and polyhydroxy aryl compounds, particularly dihydroxy aryl compounds having free coupling positions. These condensation products are prepared by refluxing 1 mol of the aliphatic aldehyde with approximately 2 mols of the dihydroxy aryl compound in a bath made slightly acid with formic acid at a temperature of less than 100° C. for from 2 to 4 hours. In the case of the more reactive dihydroxy aryl compounds, such as 2,3-dihydroxynaphthalene, the lower temperature should be used to prevent resin formation. Such a process is more fully described in German Patents Nos. 282,313 and 344,033 which particularly describe the production of condensation products of aliphatic aldehydes and polyhydroxybenzenes. The same method of preparation, however, is applicable to the dihydroxynaphthalenes as well. The products of this condensation reaction can probably be characterized by the formula

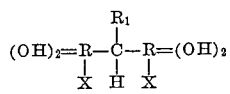

wherein R designates an aryl radical such as phenyl and naphthyl radicals, X is a substituent selected from the group consisting of hydrogen, alkyl, halogen, alkoxy and sulfonic acid groups, and $R_1$ designates hydrogen or an aliphatic radical such as methyl, ethyl and the like, or the radical of a sugar aldehyde such as arabinose.

In the production of the condensation products used as coupling components in this process, aliphatic aldehydes such as formaldehyde, acetaldehyde, propionaldehyde and sugar aldehydes such as arabinose are condensed in the above mentioned refluxing process with dihydroxy aryl compounds such as resorcinol, 4-methoxy resorcinol, 4-bromo resorcinol, 4-chloro resorcinol, 5-methyl resorcinol, 2,3-dihydroxynaphthalene, and 2,3-dihydroxynaphthalene-6-sulfonic acid. These condensation products may be incorporated into a two-component diazotype system by adding them to a coating solution for a diazotype layer containing in solution suitable diazo compounds which are aromatic diazonium compounds in the form of their stabilized double salts with cadmium chloride, tin chloride, zinc chloride, borofluoride, or their alkyl or aryl sulfonates or their acid sulfates or anhydrides. The most suitable diazo compounds for two-component diazotype systems are the p-aminobenzene diazos. Examples of suitable diazo compounds are the stablized diazonium compounds obtained by diazotization of:

5-amino-2-monoethylamino toluene
1-diethylamino-3-ethoxy-4-aminobenzene
1-dimethylamino-3-methoxy-4-aminobenzene
1-(N-ethyl-N-propylamino)-3-ethoxy-4-aminobenzene
1-(N-ethyl-N-butylamino)-3-methoxy-4-aminobenzene
p-Aminodiphenylamine
1-(N-ethyl-N-hydroxyethyl)-4-aminobenzene
1-benzoylamino-2,5-diethoxy-4-aminobenzene
1-diethylamino-4-aminobenzene
1-(N-ethyl-N-benzylamino)-4-aminobenzene
1-(2',6'-dichlorobenzylamino)-4-aminobenzene
1-(2',6'-dichlorobenzylamino)-2-phenoxy-4-aminobenzene
1-dimethylamino-4-aminobenzene
1-dimethylamino-3-methyl-4-aminobenzene
p-Aminophenylmorpholine
1-(N-hydroxyethyl-N-methylamino)-4-aminobenzene
2-amino-1-naphthol-5-sulfonic acid The coating solutions for the preparation of two-component diazotype layers in accordance with this process may also contain other addition compounds which have been found to impart valuable properties to the diazotype or the coating solution. Such additional compounds include metal salts for intensifying the dyestuff image such as aluminum sulfate, titanium ammonium fluoride, nickel sulfate and the like; stabilizing agents such as thiourea, thiosinamine, naphthalene trisulfonic acid and its salts and the like; precoupling inhibitors such as citric, tartaric and boric acids and the like; and hygroscopic agents such as glycol, glycerine, dextrin and the like. The coating solution may be applied to the base which is to contain the light sensitive layer by means known to the art. Common methods of application include dipping the support into the coating solution by immersion or surface contact, spraying or brushing the coating solution onto the surface of the base material. As a proper base or support for the diazotype layer there may be used paper, transparentized paper, films of cellulosic derivatives such as cellulose ethers and esters, polymerized compounds such as polyvinyl compounds and super-polyamides.

Although this invention will be particularly described as applied to the two-component diazotype reproduction method which is the preferred embodiment, it is understood that it can as well be applied to the one-component process or moist developing process wherein the diazo compound is the only dye component contained in the light sensitive layer and development of the image is effected by applying a developing solution containing the azo dye coupling component after exposure of the light sensitive layer.

The following examples will serve to further illustrate this invention but they are not intended to limit it as to any of the conditions or proportions recited therein. Unless otherwise specified the parts are by weight.

*Example I*

Transparentized paper is coated with a solution containing per 100 cc. of water:

4.1 g. resorcinol-formaldehyde condensation product
4.0 g. N-hydroxyethyl-N-methylamino benzene-p-diazonium chloride-$ZnCl_2$ double salt
8.0 g. citric acid
4.0 g. thiourea
2.5 g. $ZnCl_2$
2.0 cc. isopropanol
0.5 g. saponin The coating solution is more stable to precoupling than similar coatings containing resorcinol as coupling component, even under the heat and moisture conditions such as produce rapid ageing. Upon exposure under a pattern and subsequent development with ammonia, sepia intermediate prints are obtained of excellent visual density, good opacity, excellent wash fastness and fastness to light and offset.

The resorcinol-formaldehyde condensation product was prepared by refluxing 1 mol formaldehyde with approximately 2 mols resorcinol in a bath slightly acidic with formic acid at a temperature of less than 100° C. for from 2 to 4 hours.

*Example II*

Transparentized paper is coated with a solution containing per 100 cc. of water:

4.1 g. resorcinol-formaldehyde condensation product
3.3 g. N-ethyl-o-toluidine-p-diazo-$ZnCl_2$ double salt
8.0 g. citric acid
4.0 g. thiourea
2.5 g. $ZnCl_2$
2.0 cc. isopropanol
0.5 g. saponin The coating is more stable to precoupling than similar coatings containing resorcinol as coupling component, even under the heat and moisture conditions such as produce rapid ageing. Upon exposure under a pattern and subsequent development with ammonia, sepia intermediate prints are obtained of excellent visual density, good opacity, excellent wash fastness and fastness to light and offset.

Example III

Transparentized paper is coated with a solution containing per 100 cc. of water:

4.0 g. N-hydroxyethyl-N-methylaminobenzene-p-diazonium chloride-ZnCl₂ double salt
4.4 g. 4-chloro resorcinol-acetaldehyde condensation product
8.0 g. citric acid
4.0 g. thiourea
2.5 g. ZnCl₂
2.0 cc. isopropanol
0.5 g. saponin The coating is more stable to precoupling than similar coatings containing resorcinol as coupling component, even under the heat and moisture conditions such as produce rapid ageing. Upon exposure under a pattern and subsequent development with ammonia, sepia intermediate prints are obtained of excellent visual density, good opacity, excellent wash fastness and fastness to light and offset.

The 4-chloro resorcinol-acetaldehyde condensation product was prepared by refluxing 1 mol acetaldehyde with 2 mols 4-chloro resorcinol in a bath made slightly acid with formic acid at a temperature of less than 100° C. for from 2 to 4 hours.

Example IV

Transparentized paper is coated with a solution containing per 100 cc. of water:

4.5 g. resorcinol-arabinose condensation product
4.0 g. N-hydroxyethyl-N-methylamino benzene-p-diazonium chloride-ZnCl₂ double salt
8.0 g. citric acid
4.0 g. thiourea
2.5 g. ZnCl₂
2.0 cc. isopropanol
0.5 g. saponin The coating is more stable to precoupling than similar coatings containing resorcinol as coupling component, even under the heat and moisture conditions such as produce rapid ageing. Upon exposure under a pattern and subsequent development with ammonia, sepia intermediate prints are obtained of excellent visual density, good opacity, excellent wash fastness and fastness to light and offset.

The resorcinol-arabinose condensation product was prepared by refluxing 1 mol arabinose with approximately 2 mols resorcinol in a bath made slightly acid with formic acid at a temperature of less than 100° C. for from 2 to 4 hours.

Example V

Diazotype paper stock is coated with a solution containing per 100 cc. of water:

2.8 g. 2,3-dihydroxynaphthalene-6-sulfonic acid-formaldehyde condensation product
2.5 g. N-,N-diethylaniline-p-diazo-ZnCl₂ double salt
8.0 g. citric acid
4.0 g. thiourea
2.5 g. ZnCl₂
2 cc. isopropanol The stability of the coated paper during storage is excellent. Upon exposure to light under a pattern and subsequent development with ammonia, a bright blue design on a clear white background is obtained. These prints are fast to washing, light and offset.

The 2,3-dihydroxynaphthalene-6-sulfonic acid-formaldehyde condensation product was prepared by heating 1 mol formaldehyde with approximately 2 mols 2,3-dihydroxynaphthalene-6-sulfonic acid in a bath made slightly acid with formic acid at a temperature of 50° C. for from 2 to 4 hours.

We claim:

1. A diazotype photo-sensitive layer on a suitable base containing a suitable light sensitive diazo compound and an acid condensation product of a dihydroxy aryl compound and an aliphatic aldehyde said condensation product having the following structural formula

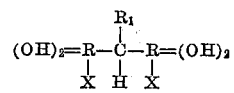

wherein R is an aryl radical, R₁ is a member of the group consisting of hydrogen and alkyl, and X is a substituent selected from the group consisting of hydrogen, alkyl, halogen, alkoxy and sulfonic acid groups, which substituent groups do not occupy the only coupling position.

2. A diazotype photo-sensitive layer on a suitable base containing a p-aminobenzene diazo light sensitive compound and an acid condensation product of a dihydroxybenzene compound and an aliphatic aldehyde said condensation product having the following structural formula

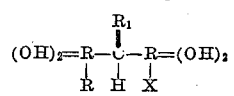

wherein R is an aryl radical, R₁ is a member of the group consisting of hydrogen and alkyl, and X is a substituent selected from the group consisting of hydrogen, alkyl, halogen, alkoxy and sulfonic acid groups, which substituent groups do not occupy the only coupling position.

3. A diazotype photo-sensitive layer on a suitable base containing a p-aminobenzene diazo light sensitive compound and an acid condensation product of a dihydroxynaphthalene compound and an aliphatic aldehyde said condensation product having the following structural formula

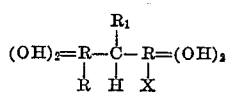

wherein R is an aryl radical, R₁ is a member of the group consisting of hydrogen and alkyl, and X is a substituent selected from the group consisting of hydrogen, alkyl, halogen, alkoxy and sulfonic acid groups, which substituent groups do not occupy the only coupling position.

4. A diazotype photo-sensitive layer on a suitable base containing a p-aminobenzene diazo light sensitive compound and a resorcinol-formaldehyde acid condensation product.

5. A diazotype photo-sensitive layer on a suitable base containing a p-aminobenzene diazo light sensitive compound and a resorcinol-arabinose acid condensation product.

6. A diazotype photo-sensitive layer on a suitable base containing a p-aminobenzene diazo light sensitive compound and a 2,3-dihydroxynaphthalene-6-sulfonic acid-formaldehyde acid condensation product.

7. A diazotype photo-sensitive layer on a suitable base containing a p-aminobenzene diazo light sensitive compound and a 4-chlororesorcinol-acetaldehyde condensation product.

WILLIAM H. VON GLAHN.
LESTER N. STANLEY.

REFERENCES CITED

The following references are of record in the file of this patent:

UNITED STATES PATENTS

| Number | Name | Date |
|---|---|---|
| 2,197,311 | Merckx et al. | Apr. 16, 1940 |
| 2,312,040 | Kendall et al. | Feb. 23, 1943 |
| 2,331,326 | Kendall et al. | Oct. 12, 1943 |
| 2,334,495 | Kendall et al. | Nov. 16, 1943 |
| 2,341,372 | Frohlich et al. | Feb. 8, 1944 |

Certificate of Correction

Patent No. 2,541,727                                                           February 13, 1951

WILLIAM H. von GLAHN ET AL.

It is hereby certified that error appears in the printed specification of the above numbered patent requiring correction as follows:

Column 6, lines 36 to 38, inclusive, and lines 54 to 56, for that portion of the structural formula in each instance reading $$(OH)_2=R- \atop R \quad \text{read} \quad (OH)_2=R- \atop X$$

and that the said Letters Patent should be read as corrected above, so that the same may conform to the record of the case in the Patent Office.

Signed and sealed this 12th day of February, A. D. 1952.

[SEAL]

THOMAS F. MURPHY,
                                                          *Assistant Commissioner of Patents.*